United States Patent [19]

Terry

[11] 4,250,230
[45] Feb. 10, 1981

[54] GENERATING ELECTRICITY FROM COAL IN SITU

[75] Inventor: Ruel C. Terry, Denver, Colo.

[73] Assignee: In Situ Technology, Inc., Denver, Colo.

[21] Appl. No.: 101,869

[22] Filed: Dec. 10, 1979

[51] Int. Cl.³ .............................................. H01M 8/00
[52] U.S. Cl. .................................... 429/12; 166/65 R; 166/75 R; 166/257
[58] Field of Search ................................. 429/12–18; 166/257, 260, 261, 267, 302, 65 R, 75 R

[56] References Cited

U.S. PATENT DOCUMENTS

| 3,278,335 | 10/1966 | Hitzman | 429/13 X |
| 3,775,073 | 11/1973 | Rhoades | 166/257 X |
| 4,041,210 | 8/1977 | Van Dine | 429/12 X |
| 4,063,416 | 12/1977 | Cooper | 166/257 X |
| 4,080,791 | 3/1978 | Nadler et al. | 429/12 X |
| 4,114,688 | 9/1978 | Terry | 166/261 X |
| 4,185,692 | 1/1980 | Terry | 166/261 X |

Primary Examiner—Charles F. LeFevour

[57] ABSTRACT

The system of the invention comprises a two well system of gasifying coal in situ wherein the generated gas stream is directed to a gas separator, which, in turn separates hydrogen and carbon monoxide into separate streams. Hydrogen is directed to one type of fuel cell and carbon dioxide is directed to another with the resultant generation of electricity.

The method of the invention comprises establishing two wells into an underground coal deposit with a reaction zone in fluid communication with the wells. Coal is gasified both in oxidizing and reducing environments, with the produced gas stream separated into its component parts. Combustible gases are directed to fuel cells with the resultant generation of electricity.

8 Claims, 3 Drawing Figures

GENERATING ELECTRICITY FROM COAL IN SITU

This invention relates to generation of electricity from fuels derived by producing coal in situ. More particularily the invention teaches the combination of an in situ coal gasification project with a multiplicity of fuel cells wherein the fuels generated from the coal are directed to fuel cells with the resultant conversion of useful energy into electricity.

BACKGROUND OF THE INVENTION

This invention extends the teachings of my U.S. Pat. No. 4,114,688, which is incorporated herein by reference.

It is well known in the art how to generate useful fuels from coal in situ. It may be briefly stated that an underground coal seam is consumed in situ by setting the coal afire, injecting reactants into one well while withdrawing the products of reaction from a nearby second well, both wells being drilled from the surface of the earth into the coal seam. Reactants commonly include air, oxygen, steam, carbon dioxide and the like. Products of underground reactions include such fuels as hydrogen, carbon monoxide, methane and other hydrocarbons; condensible coal liquids; and non-combustibles such as carbon dioxide, water vapor, nitrogen and fly ash.

In commercial practice a multiplicity of injection wells and withdrawal wells are operated in pairs to provide the desired volume of useful products on a sustained basis. From the withdrawal or production wells it is relatively easy to separate the condensible coal liquids from the gas stream and thus recover a liquid product rich in coal chemicals. Likewise, fly ash or particulate matter may be separated from the produced gas stream. Separating hydrogen, carbon monoxide, carbon dioxide and methane into individual gas streams of high purity is somewhat more complicated, but there are many commercial methods available for making such separation.

In gasifying coal in situ, the underground reactors located in the coal seam between each pair of wells have capacities for producing enormous quantities of useful gases. Of particular interest in this invention are the generated gases comprised of hydrogen, carbon monoxide and carbon dioxide. Of lesser interest are methane and condensible coal liquids, although these products may be reformed in surface facilities to provide useful fuels such as methanol, hydrogen, carbon monoxide and ammonia—all of which are suitable fuels for fuel cell operation.

In common commercial practice of generating electricity from fuels, the selected fuel is burned for its heat content, resultant heat is applied to water, water is converted into steam, steam is expanded through a turbine, the turbine spins a generator, which, in turn, produces electricity. In this relatively simple sequence of events an enormous quantity of water is consumed and thus removed from local water supplies. For each pound of steam expanded through the turbine, a corresponding pound of water must be evaporated into the atmosphere, such evaporation generally occuring from the adjacent cooling lake or from the cooling tower. This large scale evaporation of water is of little consequence in the portions of the United States receiving abundant rainfall; however, it is a very serious problem in the arid western states. The arid western states contain large reserves of useful fuels, particularly coal, which are expected to be vital to the welfare of the United States in the years ahead. Thus a series of serious problems arise in the effective utilization of coal reserves. For example, in the use of coal for generation of electricity, mine-mouth generating stations take a serious bite out of local water supplies while requiring long distance transmission lines to market. Generating stations located near markets require long distance transport of coal, which, unfortunately must be shipped with a substantial amount of its weight and volume being unburnable impurities. An obvious improvement could be made by generating electricity at the mine-mouth, or nearby, using procedures that do not require withdrawals from the local water supply. Still further improvements can be made by eliminating the requirement of mining the coal in the first place, then generating electricity with a process that also generates, rather than consumes, water. It is one object of the present invention to teach such methods.

It is well known in the art how to generate electricity in fuel cells, such fuel cells having been in existance for more than 100 years. In the earlier years fuel cells were of little practical importance because of their requirement for relatively expensive fuels, such as hydrogen, that could not compete with abundant natural gas, fuel oil and coal. In recent times, particularly in the past 20 years, significant improvements have been made in the construction and reliable operation of fuel cells in support of the NASA space program. In the common commercial practice of converting heat by the burning of fuel, maximum efficiency in the generation of electricity is in the order of 40%. On the other hand, maximum efficiencies of electricity from fuel cells approach 100%. The fuel cell process can essentially eliminate the requirement to convert the fuel's chemical energy into heat, thus substantially all of the chemical energy can be converted directly into electricity. In these types of fuel cells, electrical loads can be generated almost instantaneously with no requirement for warm up for start up, thus providing flexibility in balancing generated electricity to match the varying power demands during a 24 hour day. Some types of fuel cells, however, in the interest in broadening the types of useful fuels, do require some outside heat with a resultant loss of efficiency. Fuel cells operating at elevated temperatures routinely attain higher efficiencies than steam-electric generating systems.

With the dramatic escalation of prices for petroleum products in recent years, coupled with the probability of such increasing prices continuing indefinitely, the price advantage of such fuels is rapidly eroding as compared to the cost of fuels suitable for fuel cells. It thus follows that fuel cells are a likely condidate for future electric power generation.

Fuel cells are relatively simple devices normally assembled sandwich fashion, the center being an electrolyte. Typically on one side of the electrolyte is an anode and on the other a cathode. A gas chamber is attached to the anode to receive the fuel and a second gas chamber is attached to the cathode to receive the oxidizer. The electrolyte is selected to permit free passage of ions, while barring the passage of gas molecules, gas atoms and electrons. With the aid of catalysts the fuel is chemisorbed onto the anode and the oxidizer is chemisorbed onto the cathode. Thus the stage is set for negative ions to accumulate on the anode while positive ions collect on the cathode, completing the electro-chemical reactions of converting fuel into electricity.

One type of fuel cell of particular interest to the present invention is the cell that uses hydrogen as the fuel. This type of cell received a great deal of development in support of the Apollo moon shots conducted by NASA. In addition to generating electricity, quietly and at low temperature, the cells also generated by-product water useful both as drinking water and as cooling water.

The ability to generate water while generating electricity is of more than passing interest in the arid western portion of the United States, the location of most of the coal reserves suitable for in situ production. Thus the use of hydrogen fuel cells can overcome one serious objection to sitting electric power generating stations in the west. It is unlikely, however, that hydrogen fuel cells alone will suffice in view of the other fuels also available from coal. A combination of cells, some using hydrogen and some using carbon monoxide, would provide a more desirable balance.

One cell of interest is the so-called hot carbonate cell. In this particular design the electrolyte is molten carbonate ($CO_3$) which requires the cell to operate at elevated temperature in the order of 1400° F. On the fuel side carbon monoxide is injected into the gas chamber attached to the anode, with carbon dioxide as the product of reaction. Carbon dioxide is mixed with air for injection into the gas chamber attached to the cathode, with a portion of the air being withdrawn from the chamber. While this cell generates electricity in an operation at relatively high temperature with resultant loss in efficiency, an advantage is gained in that high catalytic efficiency is not required.

Fuel cells of other designs are of lesser interest to the present invention, but those skilled in the art will recognize that many other designs could be used in the practice of the present invention.

No particular novelty is claimed in producing useful fuels from coal in situ. No particular novelty is claimed in the use of fuel cells to generate electricity. Novelty is claimed in combining an in situ coal gasification project with a battery of fuel cells in order to convert chemical energy into electricity.

SUMMARY OF THE INVENTION

An underground coal seam is gasified in situ and the products of reaction are delivered to an above ground gas separator. The produced gas stream is separated into discrete component streams consisting individually of $H_2$, $CO$, $H_2O$, $CO_2$, and a mixed residual. The hydrogen stream is directed to fuel cells where in electrochemical reactions with oxygen both electricity and water are generated. The carbon monoxide stream is directed to fuel cells where in electrochemical reactions with carbon dioxide and the oxygen in air, electricity is generated.

BRIEF DESCRIPTION OF THE PREFERRED EMBODIMENT

Figure 1:
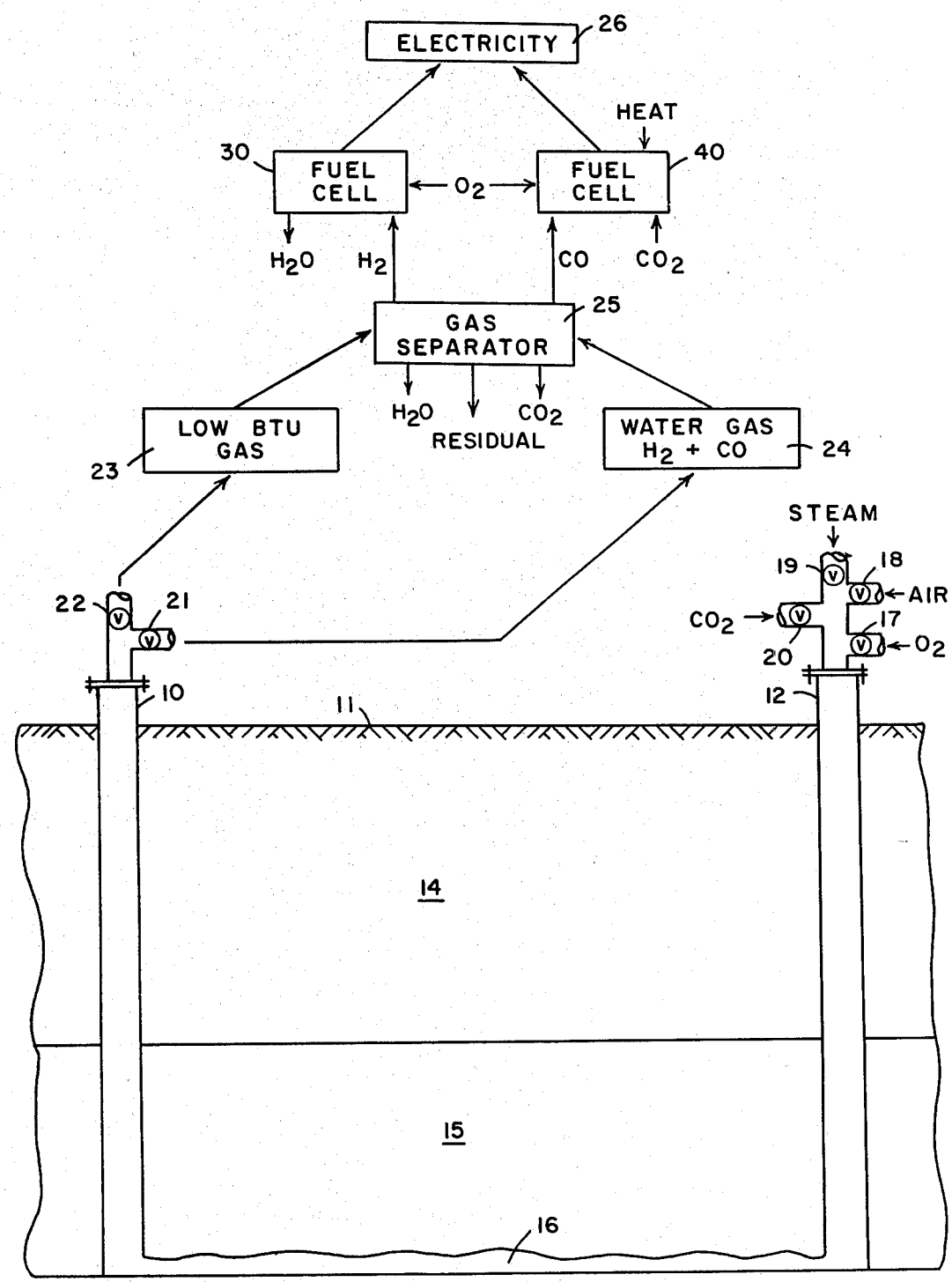
FIG. 1 is a diagrammatical vertical section taken through a portion of the earth showing arrangement of apparatus for gasifying coal in situ, together with the arrangement of apparatus of above ground equipment shown in block form.
Figure 2:
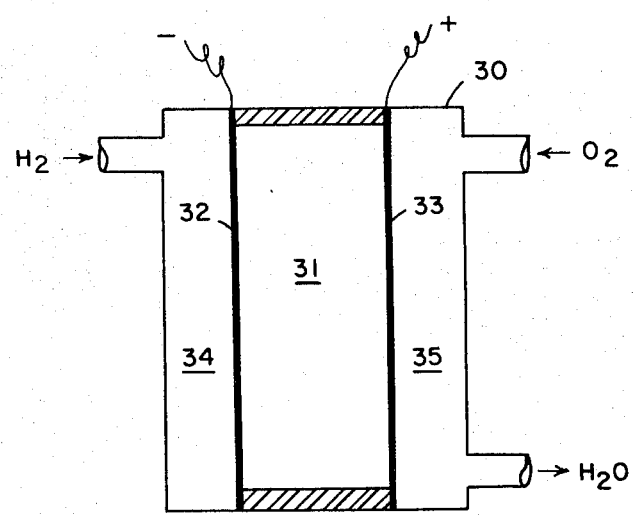
FIG. 2 is a schematic diagram of a fuel cell that operates on hydrogen and produces by-product water.
Figure 3:
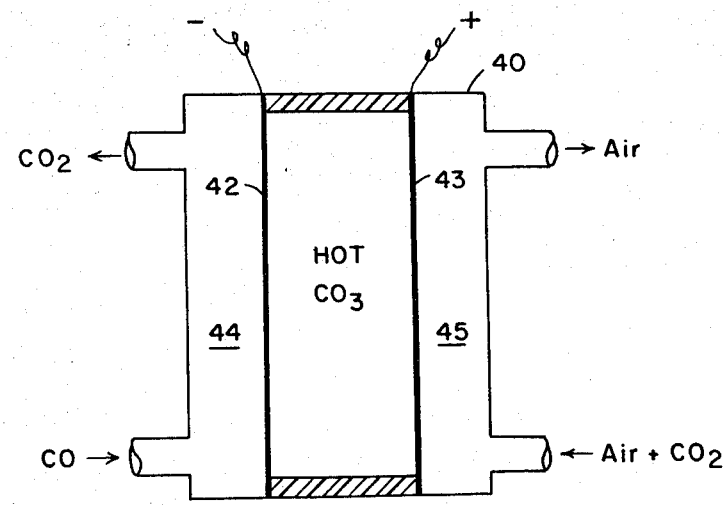
FIG. 3 is a schematic diagram of a hot carbonate fuel cell.

Referring first to FIG. 1, injection well 12 is drilled from the surface of the earth 11 through overburden 14 and through coal deposit 15. Likewise production well 10 is drilled into coal seam 15, spaced apart from well 12 a convenient distance, for example 75 feet. Coal seam 15 preferably is a thick seam, for example 30 or more feet thick. A communication passage 16 between wells 10 and 12 is created at the bottom of the coal by any convenient method, but preferable in accord with the teachings of my co-pending application for patent, Ser. No. 924,849, filed July 14, 1978 now U.S. Pat. No. 4,185,692.

An underground reaction zone, sometimes called a reactor, is established by setting the coal afire in channel 16 and bringing a portion of the coal abutting on channel 16 up to incandescent temperature, for example in the order of 2,000° F. In an elementary form of the process, valve 18 is opened and air is injected into well 12, with other valves closed. Valve 22 is opened and a flow of low BTU gas is established and accumulated, preferably in storage 23. The low BTU gas is then directed to gas separator 25 where the various components of the gas stream are separated into individual components of interest. The hydrogen component is directed to a fuel cell where in electrochemical reaction with oxygen both electricity and water are generated. In commercial practice there would be a multiplicity of wells 10 and 12 as well as fuel cells 30. The carbon monoxide component is directed to fuel cell 40 where in electrochemical reaction with the oxygen in air and carbon dioxide, electricity is generated. In commercial practice there would be a multiplicity of fuel cells 40. Water recovered in gas separator 25 and water generated in fuel cell 30 both are captured and directed to beneficial use.

The produced gas stream withdrawn from well 10 will be diluted with a substantial component of nitrogen from the air which must be separated as a residual. Thus it is preferable to minimize the amount of nitrogen in the produced gases. One method of accomplishing this preference is to use oxygen instead of air in the injection well 12. One problem in the use of oxygen is the lack of process control underground in reaction zone 16 with the resultant use of oxygen to generate abnormal quantities of carbon dioxide. Generally it could be expected that the use of oxygen would be minimized or eliminated for economic reasons.

A preferable method of minimizing generation of nitrogen into the produced gases, as well as to minimize generation of carbon dioxide, is to use an alternating sequence of air blow and split steam run in the injection well operating in concert with the production well. In this sequence, the process begins by opening valve 18 with channel 16 preheated above the ignition temperature of the coal. With all other valves closed, valve 22 is opened and the generation of low BTU is underway. This procedure continues until a substantial portion of channel 16 is raised to incandescent temperature of the abutting coal. Low BTU gas is collected in storage 23. Valves 18 and 22 are then closed, followed by opening of valve 19, then reopening valve 22. Steam is injected until the underground circuit is substantially purged of the products of reaction from the air blow. Valve 22 is then closed and valve 21 is opened, continuing the steam run and collecting the generated water gas, $H_2$ and $CO$, in storage 24. From storage 24 the water gas is directed to gas separator 25 for separating hydrogen and carbon monoxide into individual gas streams. As previously described hydrogen is directed from separator 25 to fuel cell 30 and carbon monoxide is directed to fuel cell 40.

By using the air blow, split steam run a larger amount of relatively pure useful gases can be delivered to separator 25 as compared to the sole use of the air blow. In the use of air blow, split steam run approximately 30% of the coal consumed will occur during the air blow and purging phase, and 70% of the coal consumed will be in the generation of water gas. During the air blow the generated gas stream will contain a substantial component of $CO_2$ which will be separated in facility 25. This carbon dioxide can be put to beneficial use in the injection well. To accomplish this, the air blow sequence is established as previously described until incandescense is reached in channel 16. Valve 18 is closed and valve 20 is opened. Carbon dioxide is injected until the underground circuit is substantially purged of the products of reaction from the air blow. Valve 22 is then closed, followed by the opening of valve 21. Continued injection of carbon dioxide results in its reduction to carbon monoxide, which, upon clean-up in facility 25, is then directed to fuel cell 40. It should be noted that both the steam run and the carbon dioxide run are endothermic reactons, resulting in lowering the temperature in reactor 16. These runs are continued only as long as reactor 16 retains sufficient temperature to accomplish the desired reactions. Thus repetitive cycles are established comprising oxidizing blows and reduction runs.

In any in situ coal gasification project an abundance of heat is generated, both in the form of sensible heat and the capability for heat in combustible fuels. Efficiencies can be attained by using sensible heat to preheat the oxidizers injected in well 12 and to provide heat to fuel cell 40. As described fuel cell 40 will require heat at a higher temperature than is normally available in the form of sensible heat. The additional heat requirements at elevated temperature may be attained by burning a portion of the low BTU gas available from facility 23.

Thus it may be seen that an in situ coal gasification project provides considerable flexibility in generating a suite of gases useful in the operation of fuel cells with the resultant generation of electricity, that water can be generated in copious quantities to avoid withdrawals from the local water supply, and that carbon dioxide generated may be recycled to provide additional fuel for fuel cell operation. While the present invention has been described with a certain degree of particularity, it is recognized that changes in structure may be made without departing from the spirit thereof.

What is claimed is:

1. A method of generating electricity from fuel derived by producing coal in situ utilizing fuel cells, comprising the steps of
   drilling a first well from the surface of the ground into an underground coal formation,
   drilling a second well from the surface of the ground into the coal formation, the second well being spaced apart from the first well,
   establishing a communication passage through the underground coal in fluid communication between the first well and the second well,
   igniting the coal in the communication passage,
   establishing a reaction zone in the communication passage,
   withdrawing low BTU gas from the reaction zone,
   establishing an above ground gas separator, the gas separator being capable of separating the low BTU gas into discrete component streams consisting of $H_2$, CO, $H_2O$, $CO_2$ and a mixed residual,
   establishing a first fuel cell in an above ground location,
   establishing a source of oxygen in an above ground location,
   injecting low BTU gas from the reaction zone into the above ground gas separator,
   separating the low BTU gas into discrete component streams consisting of $H_2$, CO, $H_2O$, $CO_2$ and mixed residual,
   withdrawing hydrogen from the gas separator,
   injecting hydrogen into the first fuel cell,
   injecting oxygen into the first fuel cell, and
   generating electricity in the first fuel cell.

2. The method of claim 1 further including the steps of
   terminating injecting hydrogen into the first fuel cell,
   terminating injecting oxygen into the first fuel cell,
   terminating generating electricity in the first fuel cell,
   establishing a second fuel cell in an above ground location,
   establishing a source of heat in an above ground location,
   withdrawing carbon monoxide from the gas separator,
   withdrawing carbon dioxide from the gas separator,
   injecting heat into the second fuel cell,
   injecting carbon monoxide into the second fuel cell,
   injecting oxygen and carbon dioxide into the second fuel cell,
   and generating electricity in the second fuel cell.

3. The method of claim 1 and further including the steps of
   withdrawing water from the gas separator,
   withdrawing the mixed residual from the gas separator, and
   withdrawing water from the first fuel cell.

4. The method of claim 1 and further including the steps of
   establishing a second fuel cell in an above ground location,
   establishing a source of heat in an above ground location,
   withdrawing carbon monoxide from the gas separator,
   withdrawing carbon dioxide from the gas separator,
   injecting heat into the second fuel cell,
   injecting carbon monoxide into the second fuel cell,
   injecting carbon dioxide and air into the second fuel cell,
   and generating electricity in the second fuel cell.

5. The method of claim 4 and further including the step of capturing carbon dioxide from the second fuel cell.

6. A system for generating electricity from coal in situ comprising in combination:
   a first well drilled from the surface of the earth into an underground coal formation, the first well including means for injecting reactants into the coal formation,
   a second well drilled from the surface of the earth into the coal formation, the second well including means for withdrawing fluids from the coal formation, a communication means through the underground coal formation, the communication means being in fluid communication with the first well and with the second well, a gas separator means for separating from produced gas stream the individual components consisting of hydrogen, carbon monoxide, water, carbon dioxide and a mixed residual, the gas separator means being in fluid communication with the second well, a first fuel cell capable of generating electricity, the first fuel cell being in fluid communication with the gas separator means, and a source of oxygen means in fluid communication with the first fuel cell.

7. The system of claim 6 and further comprising a second fuel cell capable of generating electricity, the second fuel cell being in fluid communications with a source of heat means, with the gas separator means and with a source of oxygen means.

8. The system of claim 6 and further comprising a low BTU gas storage means in fluid communication with the second well and with the gas separator means.

* * * * *